A. A. BOWSER.
VALVE LOCKING MECHANISM.
APPLICATION FILED JUNE 8, 1914.
1,175,592.
Patented Mar. 14, 1916.
3 SHEETS—SHEET 2.
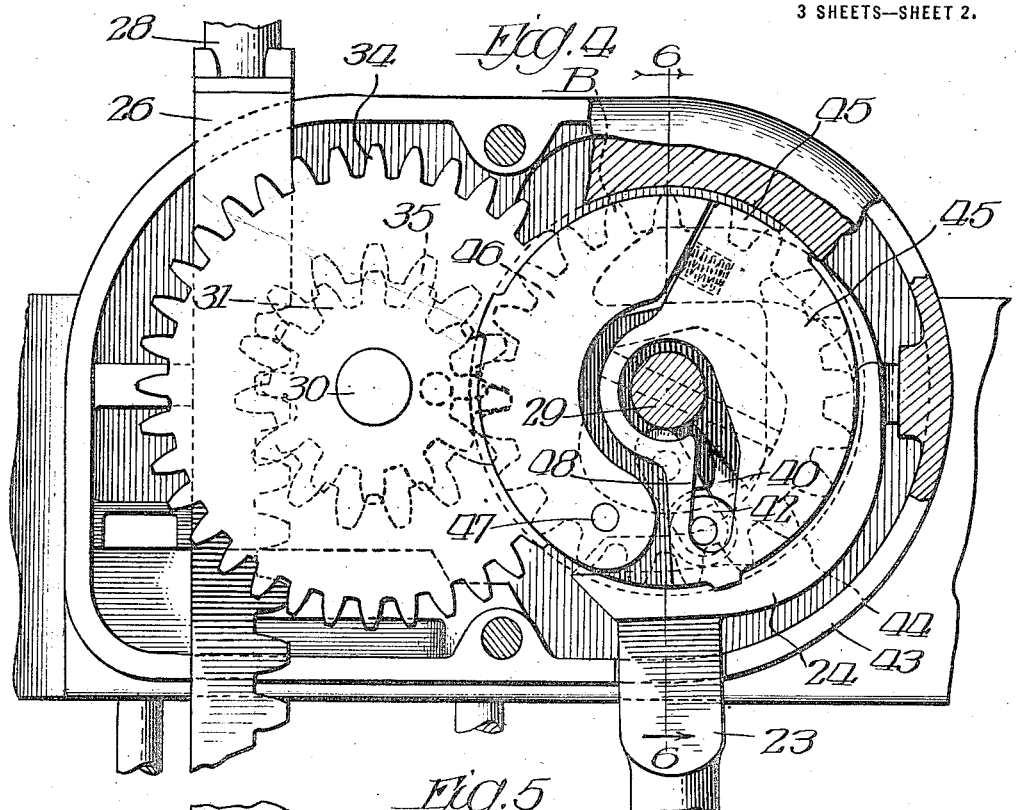
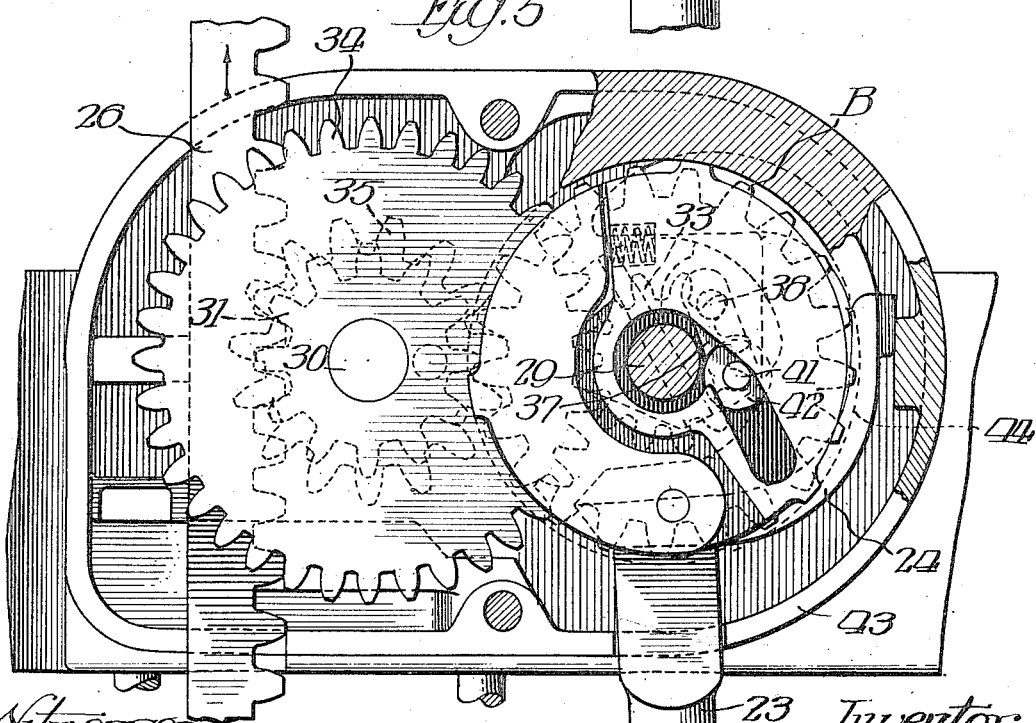

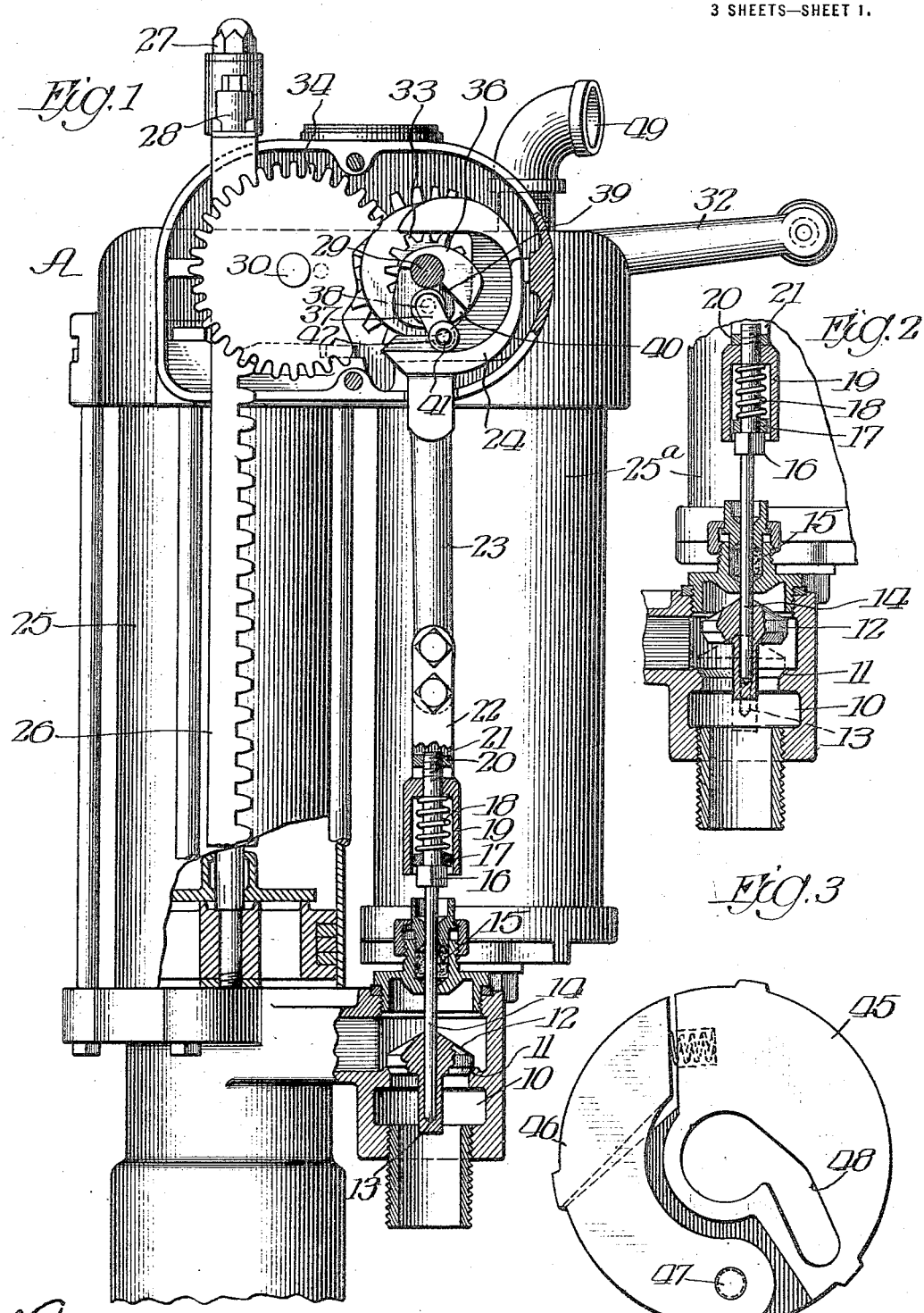

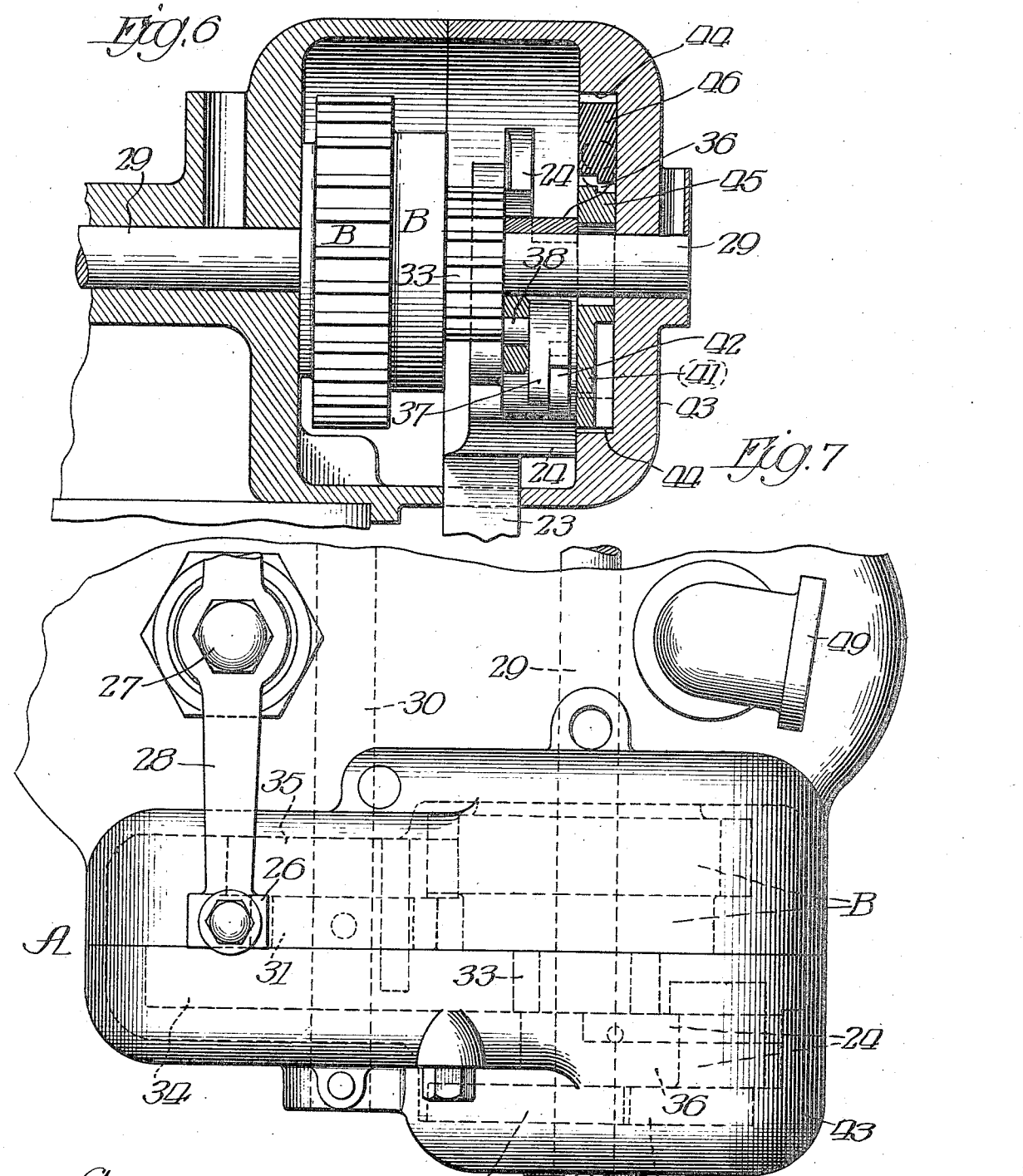

UNITED STATES PATENT OFFICE.

ALLEN A. BOWSER, OF FORT WAYNE, INDIANA.

VALVE-LOCKING MECHANISM.

1,175,592.  Specification of Letters Patent.  Patented Mar. 14, 1916.

Application filed June 8, 1914. Serial No. 843,905.

*To all whom it may concern:*

Be it known that I, ALLEN A. BOWSER, a citizen of the United States, residing at Fort Wayne, in the county of Allen and State of Indiana, have invented certain new and useful Improvements in Valve-Locking Mechanism, of which the following is a specification.

My invention relates to valve locking mechanism and has for its primary object the provision of improved mechanism of that class which shall have improved means for locking a valve in a given position.

With the above and other objects in view, this invention consists substantially in the combination, arrangement, and construction of parts, all as hereinafter described, shown in the accompanying drawings, which form a part of this specification and illustrate the preferred embodiment of my invention, and more particularly set forth in the subjoined claims.

In the drawings: Figure 1 is a side elevation of a pump constructed in accordance with the principles of this invention, certain parts being removed and others shown in section; Fig. 2 is a view of a sectioned portion of Fig. 1, showing a different position of the parts; Fig. 3 is a slotted friction ring in side elevation; Fig. 4 is an enlarged detail view of a portion of the pump shown in Fig. 1; Fig. 5 is a view similar to Fig. 4, illustrating a different position of the parts; Fig. 6 is a section taken approximately on line 6—6 of Fig. 4; Fig. 7 is a top plan view of a portion of the pump illustrated in Fig. 1, showing in dotted lines the relation of various parts within the case.

The letter A indicates generally the single-acting piston pump illustrated in the drawings and which is provided with the intake 10, having a valve seat 11, and a puppet valve 12 coöperating therewith. The valve 12 is centrally bored from the top down to a point short of its bottom, as at 13, and coöperating with this bore is a lock rod 14, loosely fitting within the bore. The lock rod extends upwardly from the intake 10 and any suitable means is provided for properly positioning the rod packing material 15 to prevent leakage from the intake. Preferably, the packing material 15 exerts sufficient pressure upon the lock rod to maintain the lock rod and all parts supported thereby against movement by the force of gravity. Below its upper extremity, but above the intake casing 10, the lock rod 14 is provided with an adjustable stop comprising a nut 16 and a washer 17, above which is positioned a coil spring 18 surrounding the lock rod and bottomed upon the washer. The washer is of a diameter to fit loosely within a cylinder 19, which is open at its bottom and apertured in its top for reciprocal movement longitudinally of the rod 14. The coil spring 18 abuts at its upper end against the inner surface of the top of the cylinder 19, and a nut 20 is threaded upon the upper extremity of the lock rod 14, above the cylinder. Upon opposite sides the cylinder is provided with upwardly extending arms 21 and 22 (See Fig. 1), which arms are spaced from each other at their upper extremities and engage opposite sides of the lower end of a thrust rod 23. At its upper end the thrust rod carries a yoke generally indicated by numeral 24. Downward movement of the lock rod 14 to the bottom of the bore 13 positively closes the valve 12 and when held in its lowermost position the lock rod locks the valve 12 closed. Reciprocation of the lock rod upwardly releases the valve for movement from its seat. The reciprocation of the lock rod is accomplished by reciprocation of the cylinder 19, thrust rod 23, and yoke 24; the yoke receiving its movement from devices actuated by the pump operating apparatus. In addition to reciprocating the yoke the devices just mentioned act during a certain position of the pump operating apparatus to maintain the yoke 24 in its lowermost position and through cylinder 19 and spring 18 to lock the valve 12 closed.

The barrel of the pump is numbered 25, the cylinder 25ª containing a separating device which forms no part of this invention. Within the pump barrel 25 is a single-acting piston (not shown), which is reciprocated by a rack 26 connected to the piston rod 27 by means of a cross-arm 28. Adjacent its upper end the pump is provided with a power shaft 29, which the yoke 24 partially surrounds in spaced relation to the shaft. An idler shaft 30 parallel and adjacent to the power shaft 29 is also provided, and carries a rack pinion 31 rigidly fixed upon it and engaging the rack 26 to convey the power thereto. Preferably the idler shaft carries a second rack pinion 31 (not shown), meshing with a second rack 26 (not shown), which is secured to the cross-arm 28 upon the opposite side of the piston rod 27 from the rack illustrated. By any suitable means, such as the handle 32, power is applied to the shaft 29, and, through a power pinion 33 upon the power shaft, meshing with an idler gear 34 upon the idler shaft, is communicated to the idler shaft and the rack pinion 31. For a purpose to be described, an amount of lost motion approximately a quarter of a revolution of the power shaft 29, is provided between that shaft and the idler shaft 30. Any suitable mechanical means may be utilized to accomplish this end, such, for instance, as a quick return mechanism generally indicated by B in Fig. 6, whereby upon reversal of the direction of rotation of the power shaft 29, that shaft will pass through approximately a quarter of a revolution before any movement of the idler shaft 30 and the pump piston driven thereby takes place. The apparatus just described reciprocates the rack 26 and the pump piston (not shown) within the barrel 25 by rotation of the power shaft 29 and subsequent reversal thereof. It is a fact that in the pump illustrated in the drawings the upward or discharge stroke of the pump piston is accomplished by the passage of power from the pump shaft through the power pinion 33 to idler gear 34 and idler shaft 30, and that the downward or return stroke of the pump piston is accomplished by the rotation of the power shaft 29 in a reverse direction and by the passage of power through the quick return mechanism B and an idler pinion 35 fixed with relation to the idler shaft 30. However, as was stated above, any suitable mechanism for connecting the shafts 29 and 30 may be employed, which provides the lost motion above referred to. In other words, the quick return mechanism may be eliminated.

For accomplishing the reciprocal movement of the yoke 24 a cam 36 is keyed upon the power shaft 29 and during rotation of that shaft contacts with the upper reach of the yoke to raise the yoke, the thrust rod 23, the cylinder 19, and the lock rod 14. The downward or reverse movement of the yoke and lock rod, together with the parts therebetween, as well as the locking of the rod upon the valve 12, is accomplished by means of a cam bar 37, pivoted as at 38 to the cam 36 for oscillation within a recess 39 formed in the cam and between a stop 40 provided upon the cam, and the periphery of the power shaft 29. The pivot point 38 is eccentric to the power shaft 29. By means of its pivotal relation to the cam 36 the free end of the cam bar 37 may be projected outwardly beyond the periphery of the cam 36, as shown in Figs. 1, 4, and 6, or it may be folded inwardly against the periphery of the power shaft 29, as illustrated in Fig. 5. When it is in its extended position, as shown in Figs. 1, 4, and 6, the free end of the cam bar 37 contacts with the lower reach of the yoke 24 and causes the downward movement of the yoke, which downward movement exerts pressure upon the spring 18, and through lock rod 14 closes the valve 12. This closed position of the valve 12 is illustrated in Fig. 1. At its free end the cam bar 37 is provided with a stud 41, which as shown in Fig. 6, protrudes outwardly from the cam bar and from the outer surface of the yoke 24. For the reduction of friction in the operation of the parts an anti-friction roller 42 is preferably provided, journaled upon the stud 41, the roller contacting with the lower reach of yoke 24 during the downward actuation of the yoke. Within the casing 43 of the pump is provided a circular recess 44, within which is positioned a friction ring 45, having an outwardly spring pressed segmental piece 46 pivoted to it as at 47. The ring 45 is centrally apertured for passage of the power shaft 29 and is positioned within the recess 44 coaxially with the power shaft. In addition, the friction ring is provided with an approximately radial slot 48, which is engaged by the protruding stud 41. Regardless of the direction of rotation of the power shaft 29 the friction ring 45 constitutes a drag for the cam bar 37 and, by reason of the engagement between the stud 41 and the slot 48, the cam bar is oscillated about its pivot 38. A discharge for the pump is indicated at 49, in Figs. 1 and 7.

In the operation of my invention, considering the parts in the position illustrated in Fig. 1, wherein the pump piston is at the lower end of its path of movement and ready to begin a discharge stroke, the handle 32 is actuated to rotate power shaft 29 in a counter clockwise direction. By reason of the lost motion provided for between the power shaft and the idler shaft 30 the cam 36 is moved upwardly into contact with the upper reach of yoke 24 and raises the yoke and the lock rod 14 from closing engagement with the valve 12, following which upward movement of the pump piston and discharge from the pump begin. During this upward discharge movement of the pump piston the parts assume the relative positions illustrated in Fig. 5. The rotation of the power shaft 29 carries the pivot 38 around with the shaft and by reason of the drag of the friction ring 45 upon stud 41 the cam bar 37 is oscillated about its pivot into contact with the periphery of the power shaft, following which the continued rotation of the power shaft causes the friction ring to move around in its recess synchronously with the shaft. Upon reversal of the handle 32 to rotation in a clockwise direction, for the purpose of returning the pump piston to the lowermost position after discharge, the drag of the friction ring causes the stud 41 to travel radially with respect to the ring and oscillates the cam bar outwardly about its pivot into contact with the stop 40. In this position of the parts the free end of the cam bar and the cam roller 42 protrude beyond the surface of the cam 36 and the roller engages the lower reach of yoke 24, forcing the yoke downwardly and, through the medium of the spring 18 and lock rod 14, closing the valve. The cam and cam bar are so related circumferentially to the power shaft 29 that when the pump piston has reached the bottom of its path of travel and is in position to begin a discharge stroke, the axis of shaft 29, together with the pivot 38 and the stud 41, are so nearly centered in a line directly above the lower reach of yoke 24 that they are practically upon a dead center and are holding the valve 12 locked by reason of contact of the roller 42 against the lower reach of the yoke. It is to be noted, therefore, that while the pump is at rest at the bottom of its path of movement, which is the normal position of the parts when the pump is not in use, the valve 12 is locked in closed position and the body of liquid within the pump is maintained throughout the pump without leakage backwardly past the valve seat 11. By the prevention of such leakage there is assured a discharge of the full capacity of the pump at each actuation thereof regardless of the length of time during which the pump has stood idle. Fig. 1 illustrates the closed position of the valve 12 and the parts operating thereon, and Fig. 2 illustrates those parts in lifted position and the valve in full lines lifted from its seat. It is to be observed that the upper reach of the yoke 24 is inwardly offset, this provision being made in order that during the reversal of the pump, that is, while the pump piston is returning from the upper to the lower position, the roller 42 will clear the upper reach of the yoke. The lower reach of the yoke 24 normally contacts with the adjacent inner side surface of the friction ring 45 and is guided partially thereby, the casing 43 or any other suitable means likewise assisting in the proper guiding of the yoke when it is moved.

In the accompanying drawings and in the foregoing description is set forth the preferred embodiment of my invention, but it is obvious that one skilled in the art may make modifications thereof without departing from the spirit of the invention.

I claim:

1. The combination with a single acting piston pump having a valved piston and an intake valve at the bottom of the pump, means for retaining the piston normally at rest at the bottom of its stroke, and means operated by the pump for locking the intake valve closed when the pump piston is at the bottom end of its stroke in position to begin to discharge liquid from the pump.

2. The combination with an upright self-measuring piston pump having a valved piston and adapted to be normally at rest at the bottom of its stroke, of an intake therefor and a valve in the intake at the bottom of the pump, and locking means for the intake valve operated by the pump to positively close the intake valve and to hold it closed throughout the entire stroke of the piston in one direction and while it is at rest in its lowermost position.

3. A single acting pump having a valved piston and a valve intake in combination with locking mechanism for the intake valve only operated by the pump to positively close the intake valve when the piston is moved in one direction and at one end of the stroke, the intake valve being free to open in the entire other direction of movement of the piston.

4. The combination with a pump having an intake valve, of mechanism for operating the pump more rapidly in one direction than in the other, and locking means operated with the pump to hold said valve positively closed in one direction of movement of the pump.

5. The combination with a single acting piston pump having an intake valve, of mechanism for operating the piston more rapidly upon its return stroke than upon its discharge stroke, and locking means operated by the said mechanism to positively close the valve when the pump piston is on its return stroke.

6. The combination with a self-measuring piston pump having an intake valve, of quick return mechanism for moving the piston more rapidly upon its return stroke than on its discharge stroke, and locking means for the intake valve operated by the quick return mechanism for positively closing the valve on the return stroke but allowing it to open freely upon the discharge stroke thereof.

7. The combination with a pump, a valve therefor provided with a recess extending from the top surface partially through such valve, a rod loosely seated in said recess and thereby serving to guide such valve, and means for periodically locking the rod to its seat in the recess and then holding the valve closed.

8. The combination with a pump, of a valve therefor provided with a recess extending from the top partially through said valve, a rod loosely seated in said recess and thereby serving to guide said valve, means for periodically locking the rod to its seat in the recess and then holding the valve closed, and a spring interposed between the rod and its locking means to make resilient the action of the means on the valve.

9. The combination with a pump having a rotary operating mechanism, an intake and a puppet valve therefor, a reciprocable rod for locking and guiding the valve in closed and open position, and means comprising a friction ring for controlling the reciprocation of the rod.

10. The combination with a single acting reciprocable pump having an intake and a puppet valve therefor, of a reciprocable locking rod movable parallel with the piston, operating mechanism for the pump and said rod comprising a rotatable shaft, a yoke extending on opposite sides of the shaft and having connection with the rod, and frictional means depending for operation upon the direction of rotation of the shaft to move the yoke in opposite direction.

11. In a pump, an intake and a puppet valve therefor, the valve having a bore extending therein from one side thereof, and a reciprocable rod adapted to be moved to the bottom of the bore for holding the valve closed and to be moved in the other direction to allow the valve to open and forming a guide for the valve at all times.

12. The combination with a pump having an intake and a puppet valve therefor, of a reciprocable lock rod movable in one direction to close the valve and in the other direction to release it, rotatable operating mechanism for the pump, a reciprocable yoke connected to the lock rod, an actuating part carried by the operating mechanism, and a friction ring to control the operation of the actuating part and dependent for operation upon the direction of rotation of the operating mechanism.

13. The combination with a pump having an intake and a puppet valve therein, of a reciprocable lock rod movable in one direction to close the valve and in the opposite direction to release it, rotatable actuating apparatus for the pump, a reciprocable yoke with which the lock rod is connected for synchronous movement, and devices actuated by said apparatus for reciprocating the yoke comprising a rotatable cam disposed within the yoke and arranged to move the yoke in one direction, and a cam bar eccentrically pivoted to the cam and arranged to move the yoke oppositely during rotation of said apparatus in one direction and to idle with relation to the yoke during the movement of said apparatus in the reverse direction.

14. The combination with a pump having an intake and a puppet valve therein, of a reciprocable lock rod movable in one direction to close the valve and in the opposite direction to release it, rotatable actuating apparatus for the pump, a reciprocable yoke with which the lock rod is connected for synchronous movement, devices actuated by said apparatus for reciprocating the yoke comprising a rotatable cam disposed within the yoke and arranged to move the yoke in one direction, and a cam bar eccentrically pivoted to the cam and arranged to move the yoke oppositely during rotation of said apparatus in one direction and to idle with relation to the yoke during the movement of said apparatus in the reverse direction, and means for oscillating the cam bar about its pivot.

15. The combination with a pump having an intake and a puppet valve therein, of a reciprocable lock rod movable in one direction to close the valve and in the opposite direction to release it, rotatable actuating apparatus for the pump, a reciprocable yoke with which the lock rod is connected for synchronous movement, devices actuated by said apparatus for reciprocating the yoke comprising a rotatable cam disposed within the yoke and arranged to move the yoke in one direction, and a cam bar eccentrically pivoted to the cam and arranged to move the yoke oppositely during rotation of said apparatus in one direction and to idle with relation to the yoke during the movement of said apparatus in the reverse direction, and means for oscillating the cam bar about its pivot, comprising a friction ring having an approximately radial slot, and an extension upon the free end of the cam bar engaging said slot.

16. The combination with a pump having an intake and a puppet valve therein, of a reciprocable lock rod movable in one direction to close the valve and in the opposite direction to release it, rotatable actuating apparatus for the pump, a reciprocable yoke with which the lock rod is connected for synchronous movement, and devices actuated by said apparatus for reciprocating the yoke comprising a rotatable cam disposed within the yoke and arranged to move the yoke in one direction, and a cam bar eccentrically pivoted to the cam and arranged to move the yoke oppositely during rotation of said apparatus in one direction and to idle with relation to the yoke during the movement of said apparatus in the reverse direction, and means for oscillating the cam bar about its pivot comprising a circular bearing, a friction ring having an approximately radial slot movable in the bearing and concentric with said cam, and an extension upon the free end of the cam bar engaging said slot.

17. The combination with a single-acting piston pump having an intake and a puppet valve therein, of a reciprocable lock rod movable in one direction to close the valve and in the opposite direction to release it, pump actuating apparatus rotatable in a given direction to cause discharge movement of the pump piston, reversely rotatable to cause reciprocal movement of the pump piston and including a power shaft, a reciprocable yoke with which the lock rod is connected for synchronous movement, said yoke being disposed about the power shaft, and devices actuated by said apparatus for reciprocating the yoke, comprising a cam fixed upon the power shaft and contacting with the yoke during a part of each rotation of the shaft to move the yoke and lock rod from the valve, a cam bar eccentrically pivoted to the cam and adapted during discharge movement of the pump piston to idle with respect to the yoke and during reverse movement of the pump piston to move the yoke and lock rod against said valve, and means for controlling the yoke of the cam bar comprising a circular bearing, a friction ring having an approximately radial slot, movable in the bearing, and concentric with said power shaft, and an extension upon the free end of the cam bar engaging said slot, said cam and the cam bar being arranged circumferentially with relation to the power shaft in such manner that at the conclusion of said reverse movement of the pump piston the yoke, the cam bar, and the power shaft are approximately on a dead center, and the cam bar is in valve closing contact with the yoke.

18. The combination with a pump, of an intake valve therefor, pump operating mechanism comprising a rotatable shaft, and valve operating mechanism comprising a yoke member extending on opposite sides of the shaft, a cam carried by the shaft for engaging the yoke when the shaft is rotated in one direction, and a pivoted cam member carried by the cam and movable to engage the yoke for moving it when the shaft is rotated in the opposite direction.

19. The combination with a pump having a rotatable operating shaft and an intake valve, of means for controlling the opening and closing of the valve comprising a yoke member extending on both sides of the shaft, cam members carried by the shaft, a casing to inclose some of the valve operating parts, and a friction device adapted to yieldingly engage the casing and having means for controlling the cam members for engaging the yoke depending upon the direction of rotation of the shaft.

20. The combination with a single acting pump having an operating shaft rotatable in both directions, and an intake valve therefor, of means for controlling the operation of the intake valve comprising a yoke member extending on both sides of the shaft, a shouldered cam carried by the shaft and adapted to engage the yoke in one direction of movement, a cam member pivoted to the cam proper and adapted to engage the shoulder thereof in one direction of movement of the shaft and adapted to be moved against the shaft in the other direction of rotation, and frictional means for moving the cam member in either one of the two positions depending upon the direction of rotation of the shaft.

In testimony whereof I have signed my name to this specification, in the presence of two subscribing witnesses, on this 2nd day of June A. D. 1914.

ALLEN A. BOWSER.

Witnesses:
J. R. MATLACK,
H. D. WEAVER.